United States Patent
Chien et al.

(10) Patent No.: US 9,106,343 B2
(45) Date of Patent: Aug. 11, 2015

(54) METHOD AND APPARATUS FOR PERFORMING TEMPORAL POLARIZATION INTERLEAVING IN AN OPTICAL TRANSMITTING SYSTEM

(75) Inventors: Hung-Chang Chien, Rockaway, NJ (US); Jianjun Yu, Basking Ridge, NJ (US); Ze Dong, Morristown, NJ (US)

(73) Assignee: ZTE (USA) Inc., Richardson, TX (US)

( * ) Notice: Subject to any disclaimer, the term of this patent is extended or adjusted under 35 U.S.C. 154(b) by 261 days.

(21) Appl. No.: 13/556,928

(22) Filed: Jul. 24, 2012

(65) Prior Publication Data

US 2013/0028603 A1 Jan. 31, 2013

Related U.S. Application Data

(60) Provisional application No. 61/513,477, filed on Jul. 29, 2011.

(51) Int. Cl.
| | |
|---|---|
| H04B 10/04 | (2006.01) |
| H04B 10/12 | (2006.01) |
| H04B 10/50 | (2013.01) |
| H04B 10/516 | (2013.01) |
| H04B 10/556 | (2013.01) |

(52) U.S. Cl.
CPC ........ *H04B 10/5051* (2013.01); *H04B 10/5053* (2013.01); *H04B 10/5162* (2013.01); *H04B 10/5561* (2013.01)

(58) Field of Classification Search
CPC ........ H04B 10/04; H04B 10/54; H04B 10/00; H04J 14/08; H04J 14/06
USPC ................................. 398/182–201
See application file for complete search history.

(56) References Cited

U.S. PATENT DOCUMENTS

| | | | |
|---|---|---|---|
| 7,127,174 B2 * | 10/2006 | Liu et al. ........................ 398/102 |
| 8,705,900 B2 * | 4/2014 | Goh et al. ........................ 385/3 |
| 8,909,066 B2 * | 12/2014 | Yoshida et al. ............... 398/184 |
| 2003/0090768 A1* | 5/2003 | Liu et al. ....................... 359/183 |
| 2003/0194237 A1* | 10/2003 | Farries et al. ................. 398/102 |
| 2006/0045538 A1* | 3/2006 | Corbel et al. ................. 398/152 |
| 2006/0269295 A1* | 11/2006 | Way ............................. 398/183 |
| 2007/0127932 A1* | 6/2007 | Qi et al. ........................ 398/188 |
| 2008/0037998 A1* | 2/2008 | Zhengfu et al. .............. 398/184 |
| 2008/0138014 A1* | 6/2008 | Chang et al. ................... 385/45 |
| 2009/0269080 A1* | 10/2009 | Akiyam et al. ............... 398/188 |
| 2009/0310977 A1* | 12/2009 | Barbarossa et al. .......... 398/184 |

(Continued)

*Primary Examiner* — David Payne
*Assistant Examiner* — Pranesh Barua
(74) *Attorney, Agent, or Firm* — Morgan, Lewis & Bockius LLP

(57) ABSTRACT

An optical signal transmitting system, comprising: an optical transmitter including one or more input terminals and an output terminal; and a temporal polarization interleaver including an input terminal and an output terminal, wherein the output terminal of the optical transmitter is communicatively coupled to the input terminal of the temporal polarization interleaver, wherein: the optical transmitter is configured to receive one or more input signals through its one or more input terminals, generate an output signal using the one or more input signals, the output signal including a x-polarized tributary and a y-polarized tributary that is pulse-to-pulse aligned with the x-polarized tributary, and transmit the output signal to the temporal polarization interleaver; and the temporal polarization interleaver is configured to receive the output signal from the optical transmitter and cause a predefined phase delay to one of the x-polarized tributary and the y-polarized tributary.

7 Claims, 11 Drawing Sheets

(56) References Cited

U.S. PATENT DOCUMENTS

| | | | |
|---|---|---|---|
| 2010/0021166 A1* | 1/2010 | Way | 398/79 |
| 2010/0142970 A1* | 6/2010 | Han et al. | 398/152 |
| 2010/0215374 A1* | 8/2010 | Liu et al. | 398/98 |
| 2010/0303469 A1* | 12/2010 | Barton et al. | 398/184 |
| 2012/0063781 A1* | 3/2012 | Vassilieva et al. | 398/65 |
| 2012/0093510 A1* | 4/2012 | Zhang et al. | 398/65 |
| 2012/0177372 A1* | 7/2012 | Liu et al. | 398/65 |
| 2012/0219302 A1* | 8/2012 | Sun et al. | 398/208 |
| 2012/0224852 A1* | 9/2012 | Liu et al. | 398/65 |
| 2012/0263456 A1* | 10/2012 | Tanaka et al. | 398/25 |
| 2013/0011093 A1* | 1/2013 | Goh et al. | 385/3 |
| 2013/0136451 A1* | 5/2013 | Yoshida et al. | 398/65 |

\* cited by examiner

METHOD AND APPARATUS FOR PERFORMING TEMPORAL POLARIZATION INTERLEAVING IN AN OPTICAL TRANSMITTING SYSTEM

RELATED APPLICATION

This application claims priority under 35 U.S.C. 119(e) to U.S. Provisional Application Ser. No. 61/513,477, filed Jul. 29, 2011, entitled "Method and Apparatus for Performing Temporal Polarization Interleaving In An Optical Transmitting System." The foregoing application is incorporated by reference in this application in its entirety.

FIELD OF INVENTION

The present invention relates generally to the field of optical communications and, in particular, to an optical transmitting system with improved non-linear tolerance through temporal polarization interleaving.

BACKGROUND

With the rapid growth of emerging bandwidth-demanding network services, next-generation dense wavelength division multiplexed (DWDM) optical transport technologies employing multilevel modulation formats are highly desirable to deliver information bits as many as possible over existing band-limited ITU-T channels. Polarization multiplexing return-to-zero quadrature phase shift keying (Pol-Mux-RZ-QPSK) with digital coherent detection has been recognized as the next optical transport network standard that mitigates optical link impairments by multiplexing data tributaries at a lower bit-rate so as to be handled easily by DSP-orientated coherent receivers.

Delivering DWDM signals with more modulation levels through legacy dispersion-managed networks will suffer from the significant nonlinear penalty. One approach to reduce the nonlinearity impairment is to offset the x-polarized and y-polarized time pulses by half of the symbol rate, which is also known as "temporal polarization interleaving" (TPI) that gives a lower peak transmitting power over the entire time space. Although it is possible to include the function of TPI into a PolMUX-RZ-QPSK optical transmitter by adding an additional optical time delay along either the x-polarized or the y-polarized polarization maintaining (PM) waveguide/fiber during the fabrication, many established and upcoming PolMUX-RZ-QPSK products from different vendors for 100 Gbs Ethernet applications do not have such non-standardized functionality.

SUMMARY

Accordingly, the present invention is directed to new and practical structures of DWDM optical signal transmitting systems that include both established optical transmitters (e.g., PolMUX-QPSK transmitters) and external stand-alone TPI modules.

In some embodiments, an optical signal transmitting system includes: an optical transmitter including one or more input terminals and an output terminal; and a temporal polarization interleaver including an input terminal and an output terminal, wherein the output terminal of the optical transmitter is communicatively coupled to the input terminal of the temporal polarization interleaver. The optical transmitter is configured to (i) receive one or more input signals through its one or more input terminals, (ii) generate an output signal using the one or more input signals, the output signal including a x-polarized tributary and a y-polarized tributary that is pulse-to-pulse aligned with the x-polarized tributary, and (iii) transmit the output signal to the temporal polarization interleaver. The temporal polarization interleaver is configured to receive the output signal from the optical transmitter and cause a predefined phase delay to one of the x-polarized tributary and the y-polarized tributary.

In some embodiments, an optical signal transmitting system includes: an optical interleaver including two input terminals and one output terminal; and a first optical signal transmitting sub-system and a second optical signal transmitting sub-system, each sub-system being communicatively coupled to a respective input terminal of the optical interleaver. Each of the first and second optical signal transmitting sub-system further includes: a group of optical transmitters, each transmitter including one or more input terminals and an output terminal; a group of temporal polarization interleavers, each interleaver including an input terminal and an output terminal, wherein the output terminal of a respective optical transmitter is communicatively coupled to the input terminal of a corresponding temporal polarization interleaver; and an optical multiplexer including a plurality of input terminals and an output terminal.

Within a respective optical signal transmitting sub-system, a respective optical transmitter is configured to receive one or more input signals through its one or more input terminals, generate an output signal using the one or more input signals, the output signal including a x-polarized tributary and a y-polarized tributary that is pulse-to-pulse aligned with the x-polarized tributary, and transmit the output signal to a corresponding temporal polarization interleaver. Upon receipt of the output signal from the respective optical transmitter, the corresponding temporal polarization interleaver is configured to (i) cause a predefined phase delay to one of the x-polarized tributary and the y-polarized tributary of the output signal and (ii) provide the phase-delayed output signal to a respective input terminal of the optical multiplexer. The optical multiplexer is configured to (i) combine the phase-delayed output signals from the plurality of input terminals into one output signal, the combined output signal including a combined x-polarized tributary and a combined y-polarized tributary, and (ii) transmit the combined output signal to the optical interleaver through a respective input terminal of the optical interleaver. Finally, the optical interleaver is configured to combine the output signals from the first and second optical signal transmitting sub-system into one signal.

In some embodiments, an optical signal transmitting system comprises: an optical interleaver including two input terminals and one output terminal; and a first optical signal transmitting sub-system and a second optical signal transmitting sub-system, each sub-system being communicatively coupled to a respective input terminal of the optical interleaver. Each of the first and second optical signal transmitting sub-system further includes: a group of optical transmitters, each transmitter including one or more input terminals and an output terminal; an optical multiplexer including a plurality of input terminals and an output terminal, wherein the output terminal of a respective optical transmitter is communicatively coupled to a corresponding input terminal of the optical multiplexer; and a temporal polarization interleaver including an input terminal and an output terminal, wherein the output terminal of the optical multiplexer is communicatively coupled to the input terminal of the temporal polarization interleaver.

Within a respective sub-system, a respective optical transmitter is configured to (i) receive one or more input signals through its one or more input terminals, (ii) generate an output signal using the one or more input signals, the output signal including a x-polarized tributary and a y-polarized tributary that is pulse-to-pulse aligned with the x-polarized tributary, and (iii) provide the output signal to a corresponding input terminal of the optical multiplexer. The optical multiplexer is configured to combine the output signals from the group of optical transmitters into one signal, the combined signal including a combined x-polarized tributary and a combined y-polarized tributary that is pulse-to-pulse aligned with the combined x-polarized tributary, and provide the combined signal to the input terminal of the temporal polarization interleaver. Upon receipt of the combined output signal from the optical multiplexer, the temporal polarization interleaver is configured to cause a predefined phase delay to one of the combined x-polarized tributary and the combined y-polarized tributary of the combined output signal, and transmit the combined out signal to the optical interleaver through a respective input terminal of the optical interleaver. Finally, the optical interleaver is configured to combine the output signals from the first and second optical signal transmitting sub-system into one signal.

In some embodiments, an optical signal transmitting system comprises: a temporal polarization interleaver including an input terminal and an output terminal; an optical interleaver including two input terminals and one output terminal, wherein the output terminal of the optical interleaver is communicatively coupled to the input terminal of the temporal polarization interleaver; and a first optical signal transmitting sub-system and a second optical signal transmitting sub-system, each sub-system being communicatively coupled to a respective input terminal of the optical interleaver. Each of the first and second sub-systems further includes: a group of optical transmitters, each transmitter including one or more input terminals and an output terminal; and an optical multiplexer including a plurality of input terminals and an output terminal, wherein the output terminal of a respective optical transmitter is communicatively coupled to a corresponding input terminal of the optical multiplexer.

Within a respective sub-system, a respective optical transmitter is configured to (i) receive one or more input signals through its one or more input terminals, (ii) generate an output signal using the one or more input signals, the output signal including a x-polarized tributary and a y-polarized tributary that is pulse-to-pulse aligned with the x-polarized tributary, and (iii) provide the output signal to a corresponding input terminal of the optical multiplexer. The optical multiplexer is configured to combine the output signals from the group of optical transmitters into one signal, the combined signal including a combined x-polarized tributary and a combined y-polarized tributary that is pulse-to-pulse aligned with the combined x-polarized tributary, and provide the combined signal to a respective input terminal of the optical interleaver. Next, the optical interleaver is configured to combine the output signals from the first and second optical signal transmitting sub-system into one signal; and the temporal polarization interleaver is configured to receive the output signal from the optical interleaver, cause a predefined phase delay to one of the x-polarized tributary and the y-polarized tributary of the output signal.

In some embodiments, provided is a method of performing temporal polarization interleaving in an optical signal transmitting system that includes a first optical signal transmitting sub-system and a second optical signal transmitting sub-system. For each sub-system, the method includes the steps of: feeding one or more input signals to a respective one of a group of optical transmitters; generating an output signal including a x-polarized tributary and a y-polarized tributary using the respective optical transmitter, the two tributaries being pulse-to-pulse aligned; causing a predefined phase delay to one of the polarized tributaries using a respective temporal polarization interleaver corresponding to the respective optical transmitter; combining the output signals from the multiple temporal polarization interleavers into one output signal of the sub-system using an optical multiplexer. Finally, the output signals of the first optical signal transmitting sub-system and the second optical signal transmitting sub-system are grouped into one output signal of the optical signal transmitting system using an optical interleaver.

In some embodiments, provided is a method of performing temporal polarization interleaving in an optical signal transmitting system that includes a first optical signal transmitting sub-system and a second optical signal transmitting sub-system. For each sub-system, the method includes the steps of: feeding one or more input signals to a respective one of a group of optical transmitters; generating an output signal including a x-polarized tributary and a y-polarized tributary using the respective optical transmitter, the two tributaries being pulse-to-pulse aligned; combining the output signals from the group of optical transmitters into one output signal of the sub-system using an optical multiplexer, the combined output signal including a x-polarized tributary and a y-polarized tributary; and causing a predefined phase delay to one of the polarized tributaries using a temporal polarization interleaver. Finally, the output signals of the first optical signal transmitting sub-system and the second optical signal transmitting sub-system are grouped into one output signal of the optical signal transmitting system using an optical interleaver.

In some embodiments, provided is a method of performing temporal polarization interleaving in an optical signal transmitting system that includes a first optical signal transmitting sub-system and a second optical signal transmitting sub-system. For each sub-system, the includes the steps of: feeding one or more input signals to a respective one of a group of optical transmitters; generating an output signal including a x-polarized tributary and a y-polarized tributary using the respective optical transmitter, the two tributaries being pulse-to-pulse aligned; and combining the output signals from the group of optical transmitters into one output signal of the sub-system using an optical multiplexer, the combined output signal including a x-polarized tributary and a y-polarized tributary. Next, the output signals of the first optical signal transmitting sub-system and the second optical signal transmitting sub-system are grouped into one output signal of the optical signal transmitting system using an optical interleaver; and a predefined phase delay is introduced to one of the polarized tributaries in the grouped output signal using a temporal polarization interleaver.

BRIEF DESCRIPTION OF THE DRAWINGS

The accompanying drawings, which are included to provide a further understanding of the invention and are incorporated herein and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on other types of optical signal transmitting systems.

Figure 1:
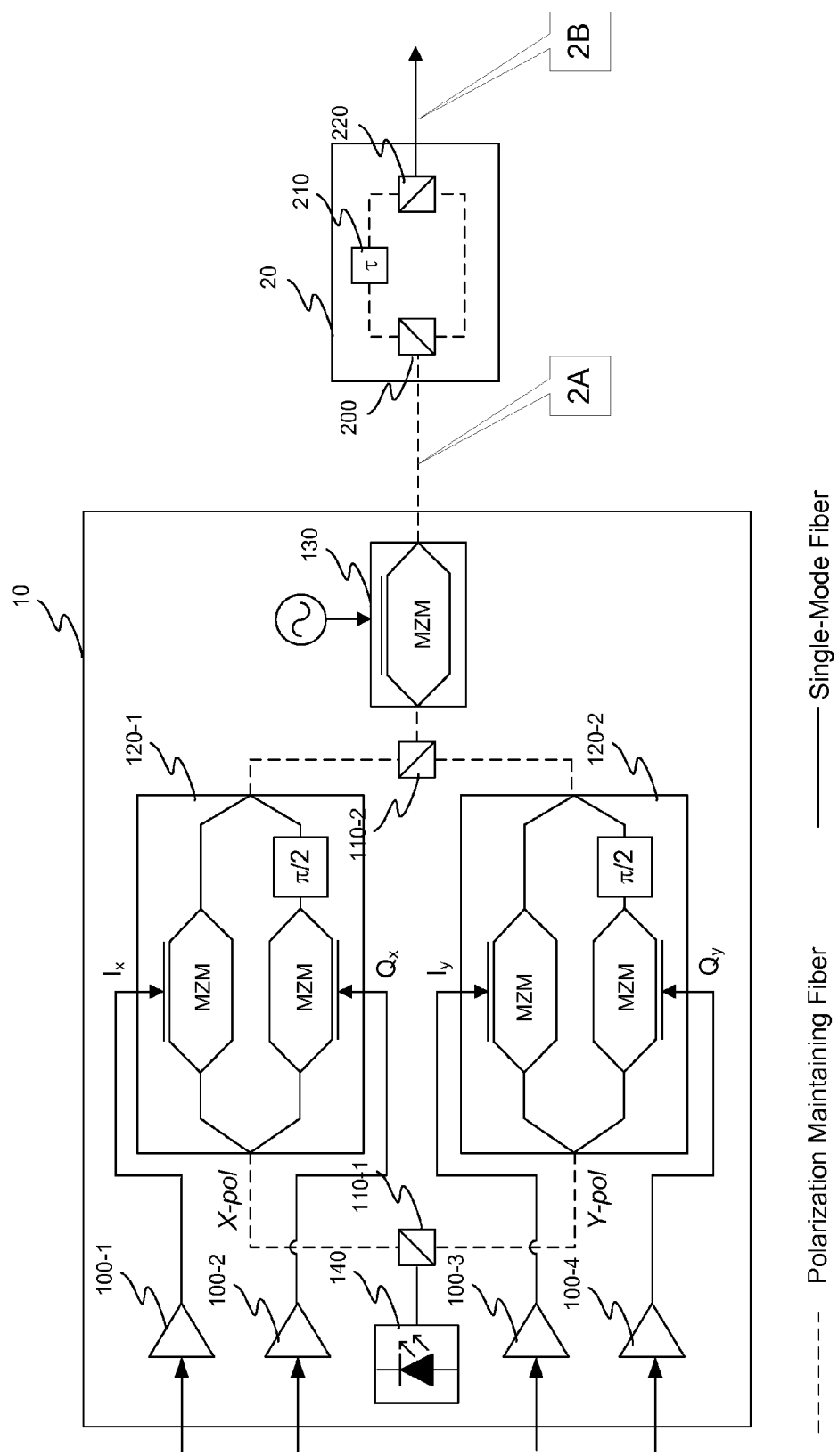
FIG. 1 is an exemplary illustration of an optical signal transmitting system and its components in accordance with the present invention.

FIG. 1 is an exemplary illustration of an optical signal transmitting system and its components in accordance with the present invention. As shown in FIG. 1, the single wavelength/channel optical transmitting system includes a Pol-MUX-RZ-QPSK optical transmitter 10 and an external temporal polarization interleaver 20. The fully-integrated optical transmitter 10 typically comprises an integrable tunable laser assembly (ITLA) 140, two sets of optical in-phase (I) and quadrature (Q) modulators 120-1 and 120-2, two polarization beam splitters (PBS) 110-1 and 110-2, a Mach-Zehnder (MZ) return-to-zero (RZ) pulse carver 130, and four electrical amplifiers (EA) 100-1 to 100-4.

Figure 2A:
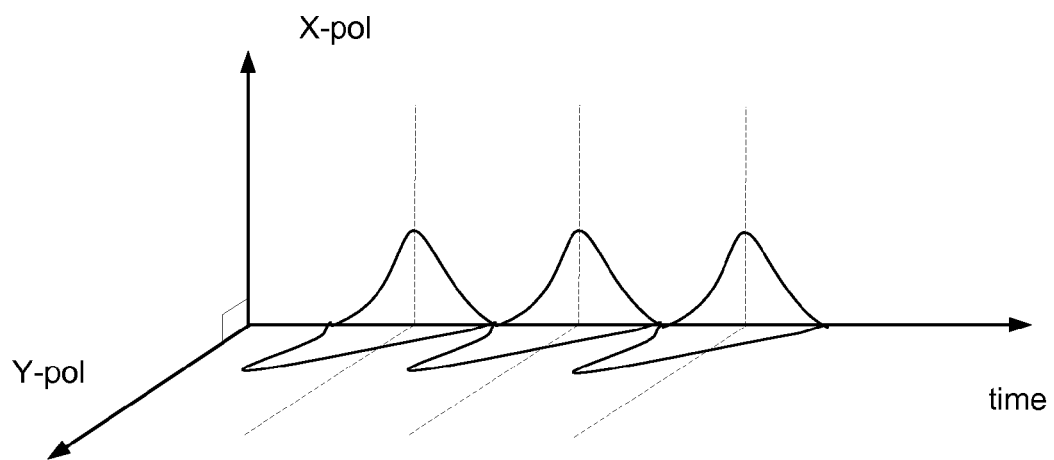
FIGS. 2A and 2B are exemplary illustrations of x-polarized and y-polarized tributaries of an optical signal before and after a temporal polarization interleaving module in accordance with the present invention.
Figure 2B:
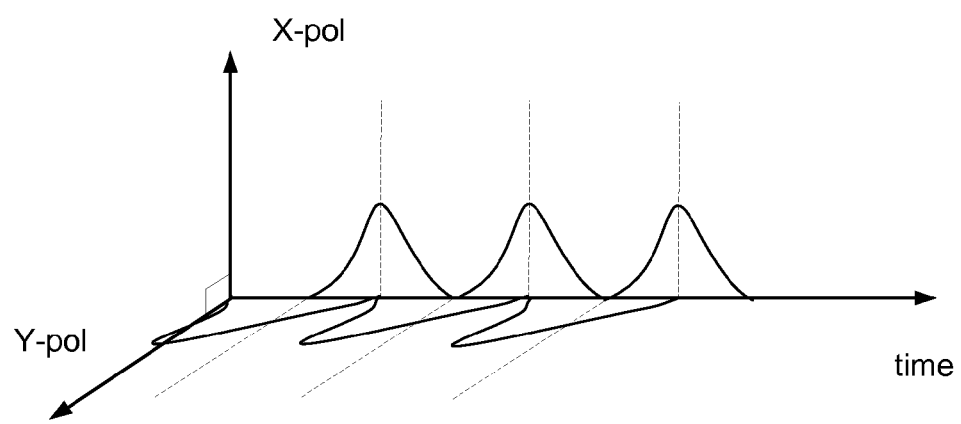

In some embodiments, the continuous-waveform (CW) optical signal launched from the ITLA 140 is divided into x-polarized and y-polarized orthogonal tributaries by the PBS 110-1, which are modulated by the data symbols at the I-Q modulators 120-1 and 120-2, respectively. Note that the data symbols are provided to the I-Q modulators 120-1 and 120-2 through the two electrical amplifier (EA) pairs. Inside the optical transmitter 10, the optical paths for both polarized signals are made to be substantially equal, so that the x-polarized and y-polarized output tributaries after the RZ pulse carver 130 are substantially pulse-to-pulse aligned as illustrated in FIG. 2A. Next, the optical signal passes through the TPI module 20 that is configured to introduce a predefined phase delay to one of the polarized signals by half of the symbol period as illustrated in FIG. 2B.

In some embodiments, as shown in FIG. 1, the TPI module 20 includes: an incoming PBS 200 for separating the x-polarized and y-polarized tributaries, an outgoing PBS 220 for combining the x-polarized and y-polarized tributaries, and an optical time delay unit 210. In some other embodiments, the TPI module can be realized by a single high polarization-mode-dispersion (PMD) fiber for generating a differential group delay (DGD) equal to half of the symbol period between the x-polarized and y-polarized tributaries. In some embodiments, as highlighted by the dashed lines, the state of polarization along the optical paths from the output of the ITLA 140 to the input of the outgoing PBS 220 in the TPI module 20 is well maintained using the polarization maintaining waveguides or fibers.

Figure 3A:
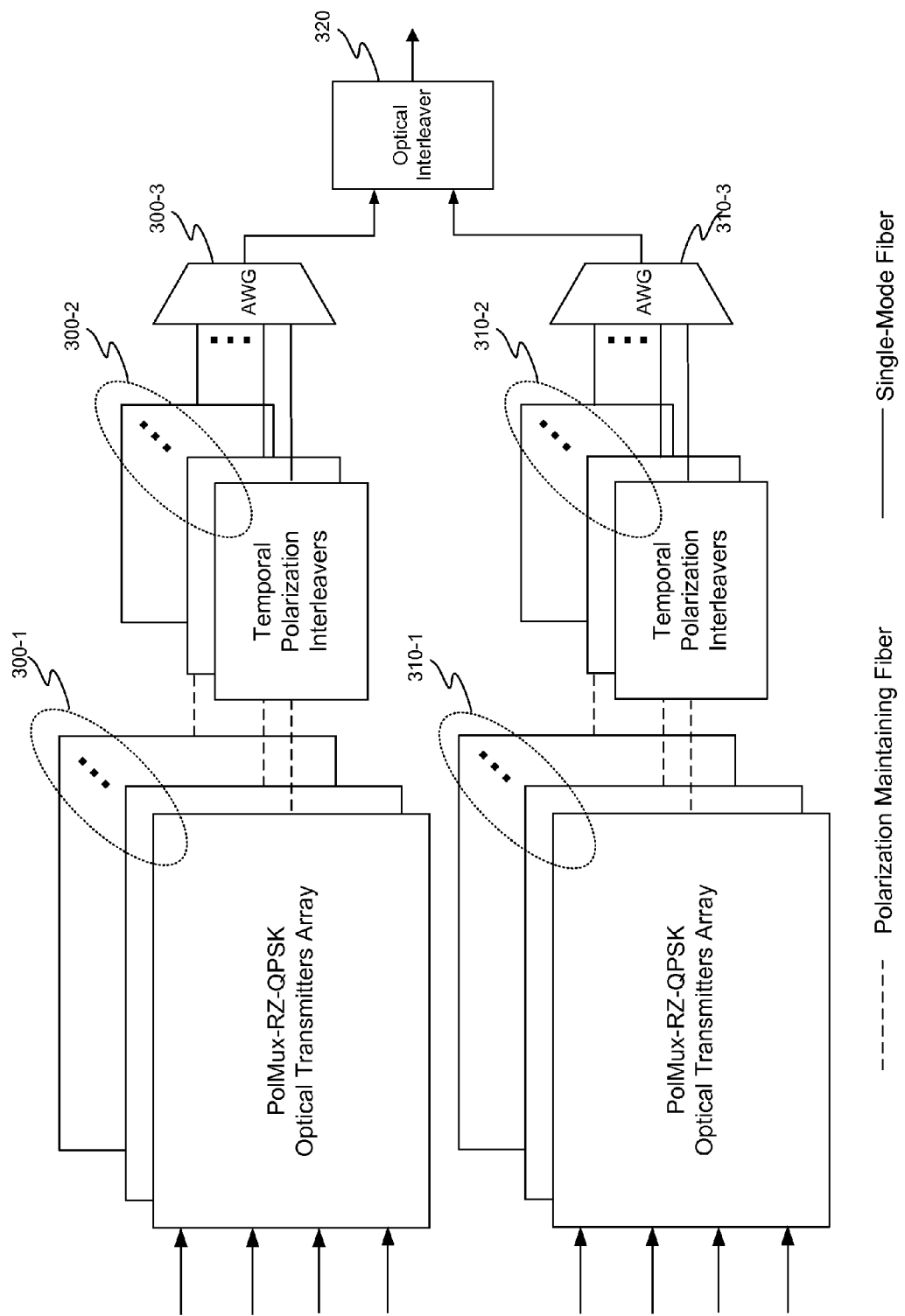
FIG. 3A illustrates an exemplary embodiment of an optical signal transmitting system in accordance with the present invention.

FIG. 3A illustrates an exemplary embodiment of an optical signal transmitting system in accordance with the present invention. In some embodiments, the optical signal transmitting system includes: an optical interleaver 320 including two input terminals and one output terminal; and a first optical signal transmitting sub-system 300 and a second optical signal transmitting sub-system 310, each sub-system being communicatively coupled to a respective input terminal of the optical interleaver 320. Each of the first and second optical signal transmitting sub-system (300, 310) further includes: a group of optical transmitters (300-1, 310-1), each transmitter including one or more input terminals and an output terminal; a group of temporal polarization interleavers (300-2, 310-2), each interleaver including an input terminal and an output terminal, wherein the output terminal of a respective optical transmitter is communicatively coupled to the input terminal of a corresponding temporal polarization interleaver; and an optical multiplexer (300-3, 310-3) including a plurality of input terminals and an output terminal.

Within a respective optical signal transmitting sub-system (300, 310), a respective optical transmitter (300-1, 310-1) is configured to receive one or more input signals through its one or more input terminals, generate an output signal using the one or more input signals, the output signal including a x-polarized tributary and a y-polarized tributary that is pulse-to-pulse aligned with the x-polarized tributary, and transmit the output signal to a corresponding temporal polarization interleaver. Upon receipt of the output signal from the respective optical transmitter, the corresponding temporal polarization interleaver (300-2, 310-2) is configured to (i) cause a predefined phase delay to one of the x-polarized tributary and the y-polarized tributary of the output signal and (ii) provide the phase-delayed output signal to a respective input terminal of the optical multiplexer. The optical multiplexer (300-3, 310-3) is configured to (i) combine the phase-delayed output signals from the plurality of input terminals into one output signal, the combined output signal including a combined x-polarized tributary and a combined y-polarized tributary, and (ii) transmit the combined output signal to the optical interleaver through a respective input terminal of the optical interleaver. Finally, the optical interleaver (320) is configured to combine the output signals from the first and second optical signal transmitting sub-system into one signal.

In some embodiments, the first sub-system 300 is configured to enable one or more even channels of the optical signal transmitting system and the second sub-system 310 is configured to enable one or more odd channels of the optical signal transmitting system. In some embodiments, the optical multiplexer (300-3, 310-3) is an arrayed waveguide gratings. In some embodiments, the optical multiplexer (300-3, 310-3) is configured to maintain the respective polarizations of the x-polarized tributary and the y-polarized tributary it receives from the corresponding temporal polarization interleavers (300-2, 310-2).

Figure 3B:
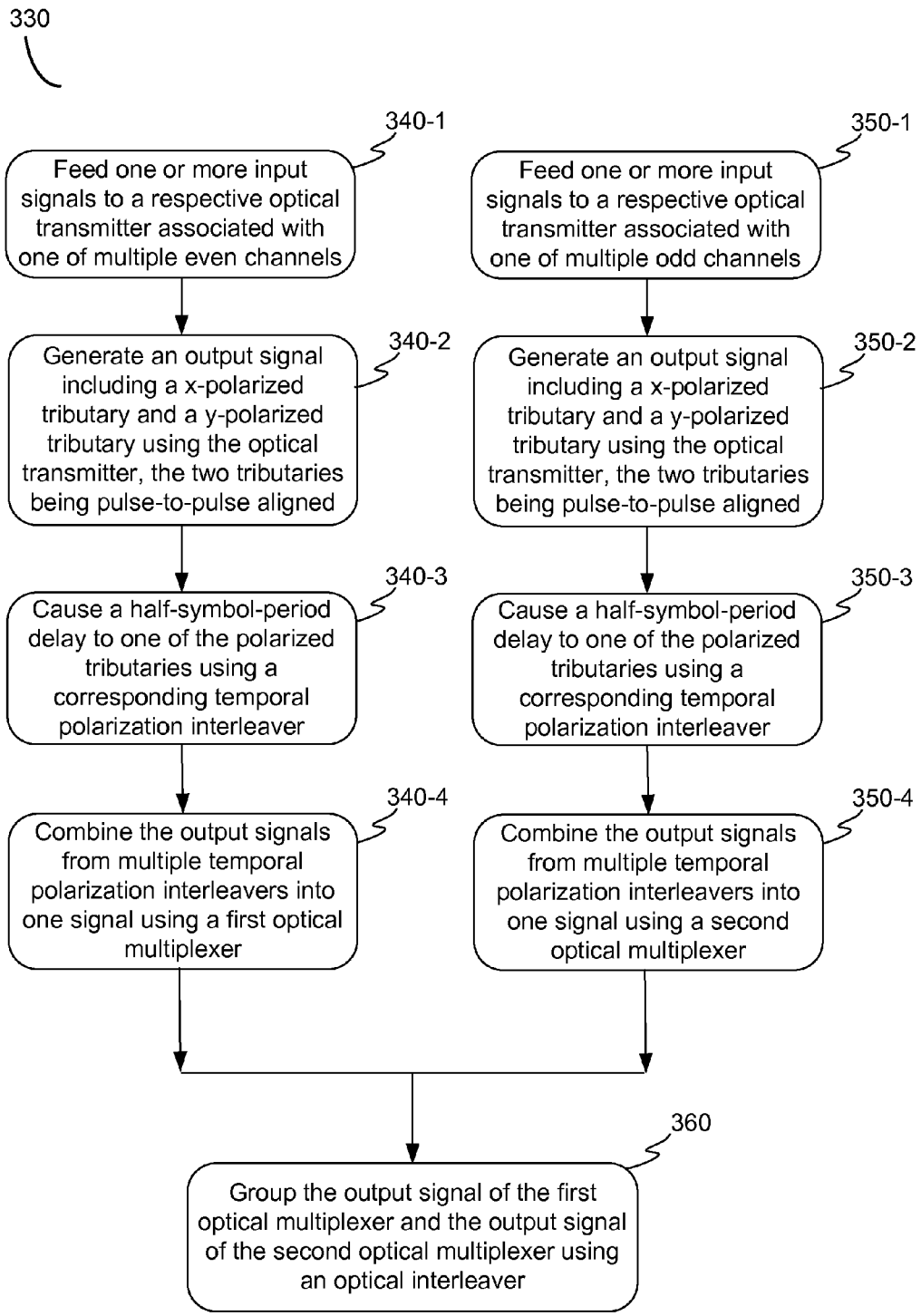
FIG. 3B depicts an exemplary flow chart illustrating how the optical signal transmitting system of FIG. 3A performs temporal polarization interleaving to an optical signal transmitting system in accordance with the present invention.

FIG. 3B depicts an exemplary flow chart illustrating how the optical signal transmitting system of FIG. 3A performs temporal polarization interleaving to an optical signal transmitting system in accordance with the present invention. For each sub-system (300, 310), the method includes the steps of: feeding one or more input signals to a respective one of a group of optical transmitters (340-1, 350-1); generating an output signal including a x-polarized tributary and a y-polarized tributary using the respective optical transmitter (340-2, 350-2), the two tributaries being pulse-to-pulse aligned; causing a predefined phase delay to one of the polarized tributaries using a respective temporal polarization interleaver corresponding to the respective optical transmitter (340-3, 350-3); combining the output signals from the multiple temporal polarization interleavers into one output signal of the sub-system using an optical multiplexer (340-4, 350-4). Finally, the output signals of the first optical signal transmitting sub-system 300 and the second optical signal transmitting sub-system 310 are grouped into one output signal of the optical signal transmitting system using an optical interleaver (360).

Figure 4A:
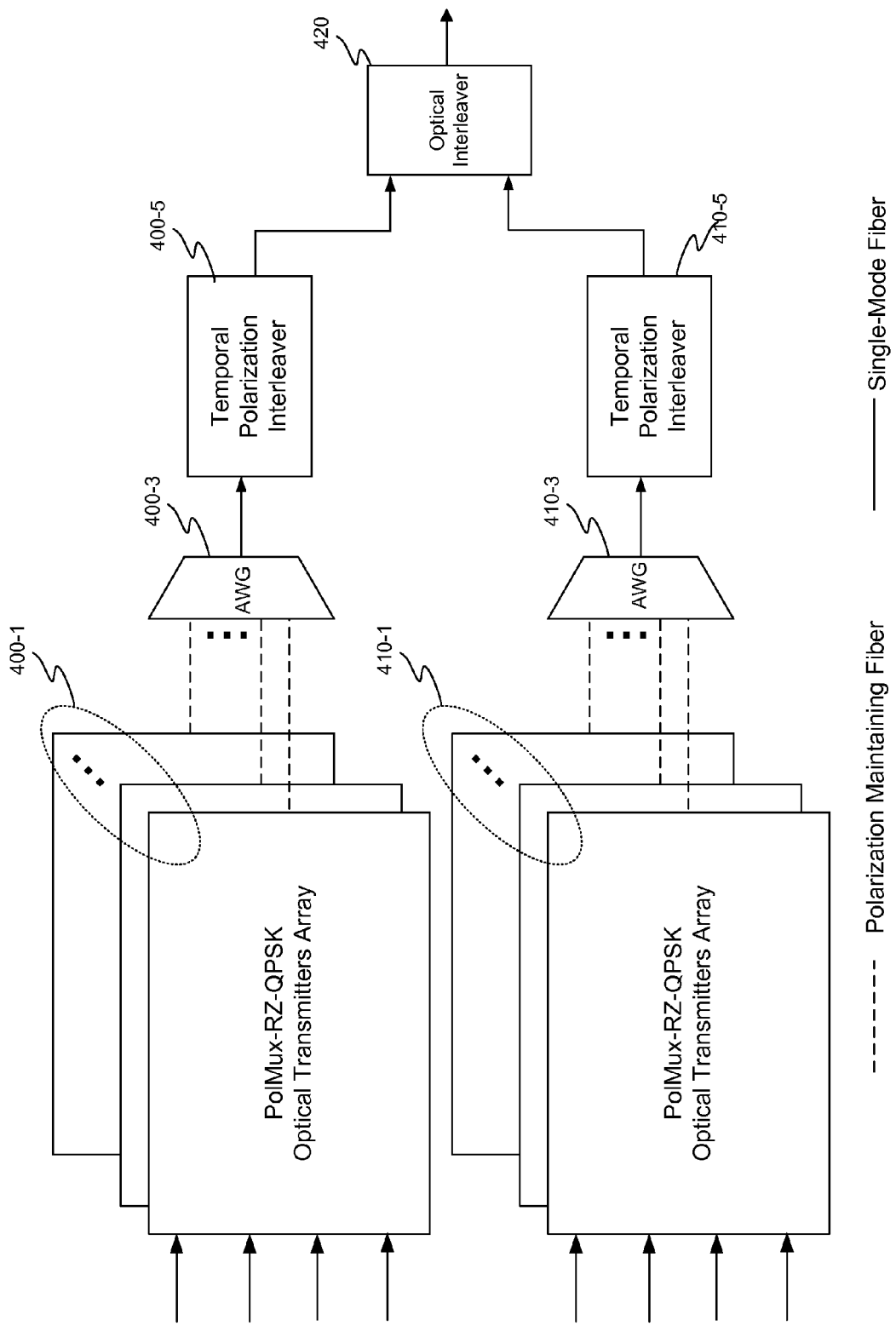
FIG. 4A illustrates another exemplary embodiment of an optical signal transmitting system in accordance with the present invention.

FIG. 4A illustrates another exemplary embodiment of an optical signal transmitting system in accordance with the present invention. In some embodiments, the optical signal transmitting system comprises: an optical interleaver 420 including two input terminals and one output terminal; and a first optical signal transmitting sub-system 400 and a second optical signal transmitting sub-system 410, each sub-system being communicatively coupled to a respective input terminal of the optical interleaver 420. Each of the first and second optical signal transmitting sub-system (400, 420) further includes: a group of optical transmitters (400-1, 410-1), each transmitter including one or more input terminals and an output terminal; an optical multiplexer (400-3, 410-3) including a plurality of input terminals and an output terminal, wherein the output terminal of a respective optical transmitter is communicatively coupled to a corresponding input terminal of the optical multiplexer; and a temporal polarization interleaver (400-5, 410-5) including an input terminal and an output terminal, wherein the output terminal of the optical multiplexer is communicatively coupled to the input terminal of the temporal polarization interleaver.

Within a respective sub-system (400, 410), a respective optical transmitter (400-1, 410-1) is configured to (i) receive one or more input signals through its one or more input terminals, (ii) generate an output signal using the one or more input signals, the output signal including a x-polarized tributary and a y-polarized tributary that is pulse-to-pulse aligned with the x-polarized tributary, and (iii) provide the output signal to a corresponding input terminal of the optical multiplexer. The optical multiplexer (400-3, 410-3) is configured to combine the output signals from the group of optical transmitters into one signal, the combined signal including a combined x-polarized tributary and a combined y-polarized tributary that is pulse-to-pulse aligned with the combined x-polarized tributary, and provide the combined signal to the input terminal of the temporal polarization interleaver. Upon receipt of the combined output signal from the optical multiplexer, the temporal polarization interleaver (400-5, 410-5) is configured to cause a predefined phase delay to one of the combined x-polarized tributary and the combined y-polarized tributary of the combined output signal, and transmit the combined out signal to the optical interleaver through a respective input terminal of the optical interleaver. Finally, the optical interleaver 420 is configured to combine the output signals from the first and second optical signal transmitting sub-system into one signal.

In some embodiments, the first sub-system 400 is configured to enable one or more even channels of the optical signal transmitting system and the second sub-system 410 is configured to enable one or more odd channels of the optical signal transmitting system. In some embodiments, the optical multiplexer (400-3, 410-3) is an arrayed waveguide gratings. In some embodiments, the optical multiplexer (400-3, 410-3) is configured to maintain the respective polarizations of the x-polarized tributary and the y-polarized tributary it receives from the respective groups of optical transmitters (400-1, 410-1).

Figure 4B:
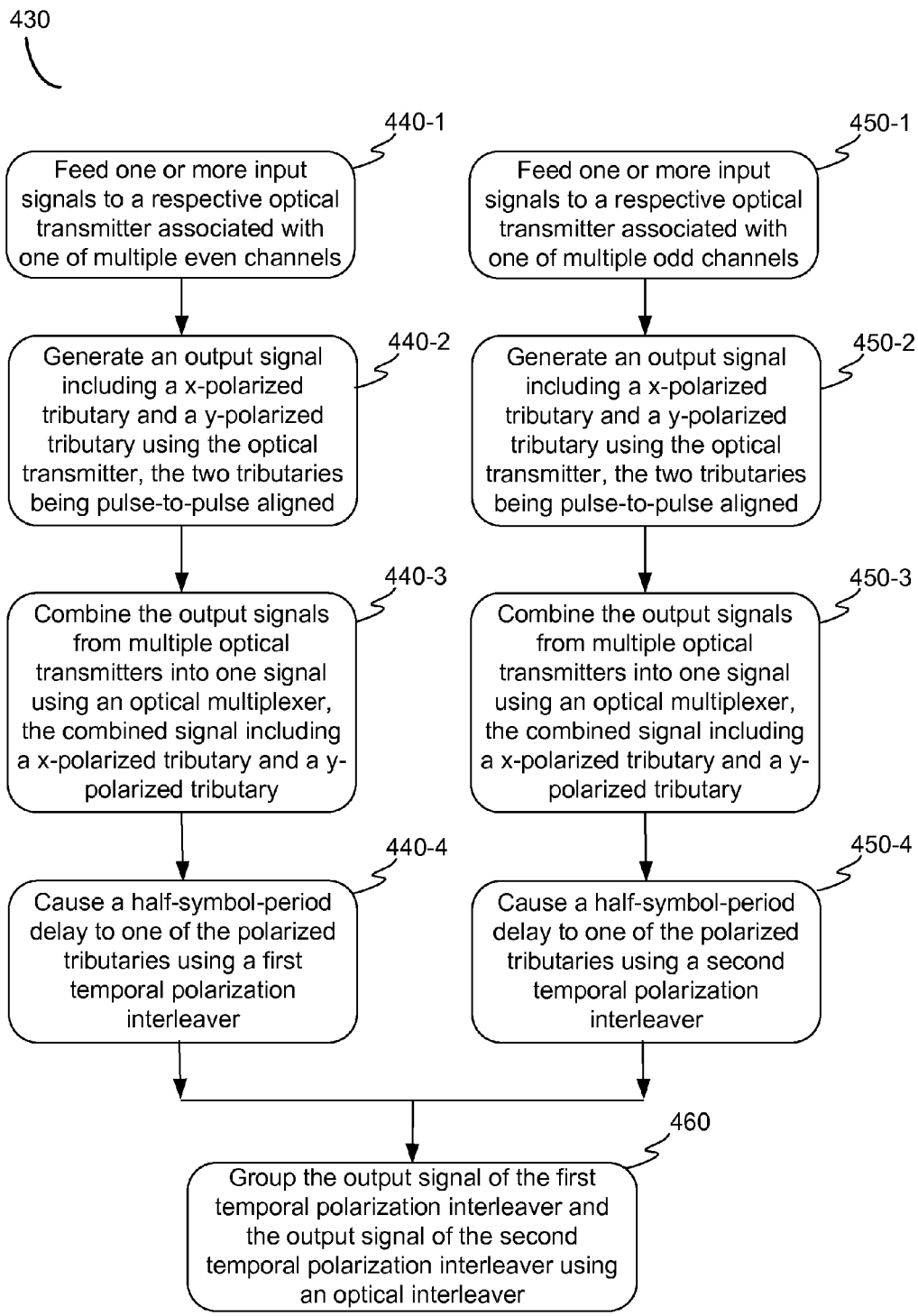
FIG. 4B depicts an exemplary flow chart illustrating how the optical signal transmitting system of FIG. 4A performs temporal polarization interleaving to an optical signal transmitting system in accordance with the present invention.

FIG. 4B depicts an exemplary flow chart illustrating how the optical signal transmitting system of FIG. 4A performs temporal polarization interleaving to an optical signal transmitting system in accordance with the present invention. For each sub-system (400, 410), the method includes the steps of: feeding one or more input signals to a respective one of a group of optical transmitters (440-1, 450-1); generating an output signal including a x-polarized tributary and a y-polarized tributary using the respective optical transmitter (440-2, 450-2), the two tributaries being pulse-to-pulse aligned; combining the output signals from the group of optical transmitters into one output signal of the sub-system using an optical multiplexer (440-3, 450-3), the combined output signal including a x-polarized tributary and a y-polarized tributary; and causing a predefined phase delay to one of the polarized tributaries using a temporal polarization interleaver (440-4, 450-4). Finally, the output signals of the first optical signal transmitting sub-system and the second optical signal transmitting sub-system are grouped into one output signal of the optical signal transmitting system using an optical interleaver (460).

Figure 5A:
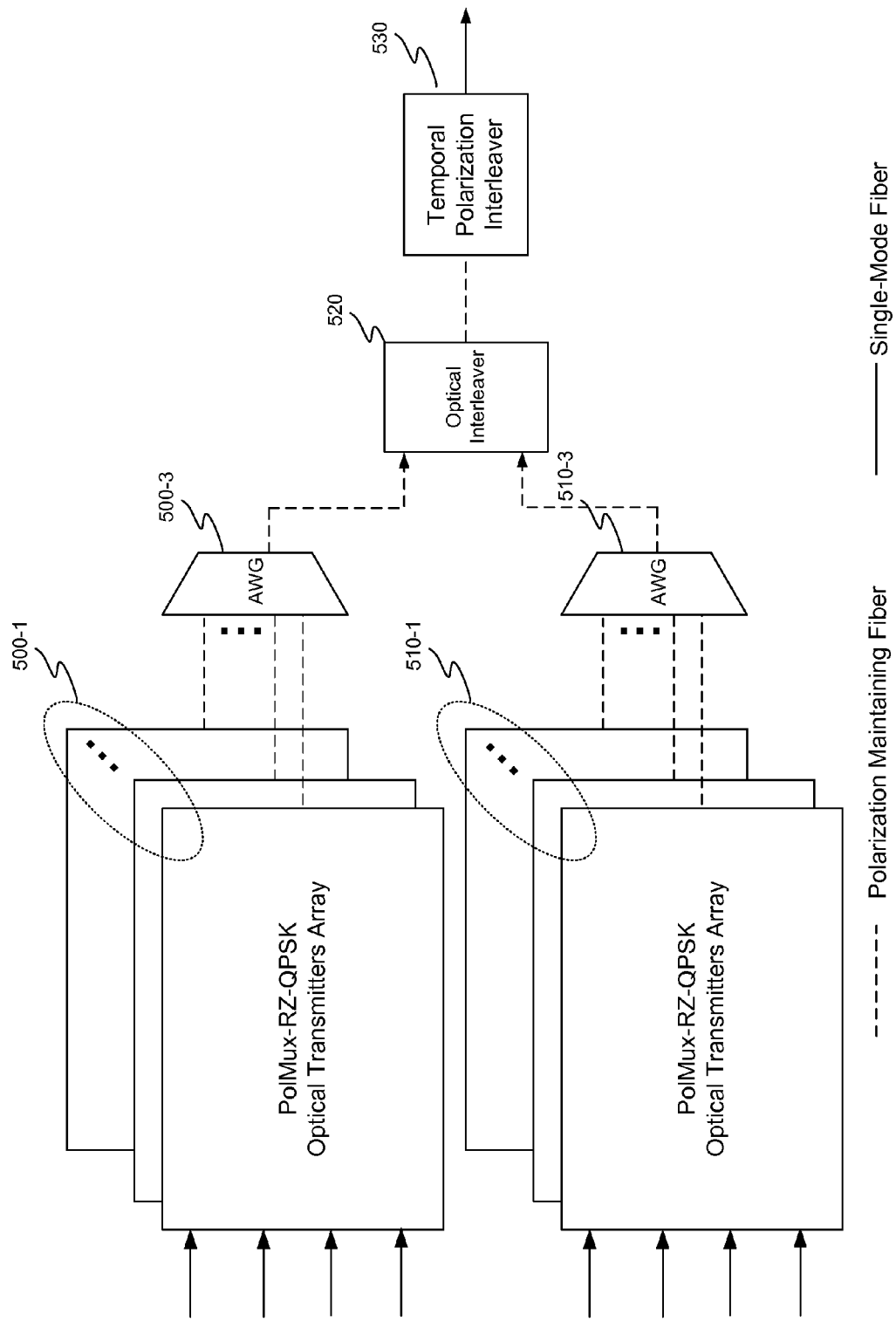
FIG. 5A illustrates yet another exemplary embodiment of an optical signal transmitting system in accordance with the present invention.

FIG. 5A illustrates yet another exemplary embodiment of an optical signal transmitting system in accordance with the present invention. In some embodiments, the optical signal transmitting system comprises: a temporal polarization interleaver 530 including an input terminal and an output terminal; an optical interleaver 520 including two input terminals and one output terminal, wherein the output terminal of the optical interleaver is communicatively coupled to the input terminal of the temporal polarization interleaver; and a first optical signal transmitting sub-system 500 and a second optical signal transmitting sub-system 510, each sub-system being communicatively coupled to a respective input terminal of the optical interleaver. Each of the first and second sub-systems (500, 510) further includes: a group of optical transmitters (500-1, 510-1), each transmitter including one or more input terminals and an output terminal; and an optical multiplexer (500-3, 510-3) including a plurality of input terminals and an output terminal, wherein the output terminal of a respective optical transmitter is communicatively coupled to a corresponding input terminal of the optical multiplexer.

Within a respective sub-system, a respective optical transmitter (500-1, 510-1) is configured to (i) receive one or more input signals through its one or more input terminals, (ii) generate an output signal using the one or more input signals, the output signal including a x-polarized tributary and a y-polarized tributary that is pulse-to-pulse aligned with the x-polarized tributary, and (iii) provide the output signal to a corresponding input terminal of the optical multiplexer. The optical multiplexer (500-3, 510-3) is configured to combine the output signals from the group of optical transmitters into one signal, the combined signal including a combined x-polarized tributary and a combined y-polarized tributary that is pulse-to-pulse aligned with the combined x-polarized tributary, and provide the combined signal to a respective input terminal of the optical interleaver. Next, the optical interleaver 520 is configured to combine the output signals from the first and second optical signal transmitting sub-system (500, 510) into one signal; and the temporal polarization interleaver 530 is configured to receive the output signal from the optical interleaver 520, and cause a predefined phase delay to one of the x-polarized tributary and the y-polarized tributary of the output signal.

In some embodiments, the first sub-system 500 is configured to enable one or more even channels of the optical signal transmitting system and the second sub-system 510 is configured to enable one or more odd channels of the optical signal transmitting system. In some embodiments, the optical multiplexer (500-3, 510-3) is an arrayed waveguide gratings. In some embodiments, the optical multiplexer (500-3, 510-3) is configured to maintain the respective polarizations of the x-polarized tributary and the y-polarized tributary it receives from the respective groups of optical transmitters (500-1, 510-1).

Figure 5B:
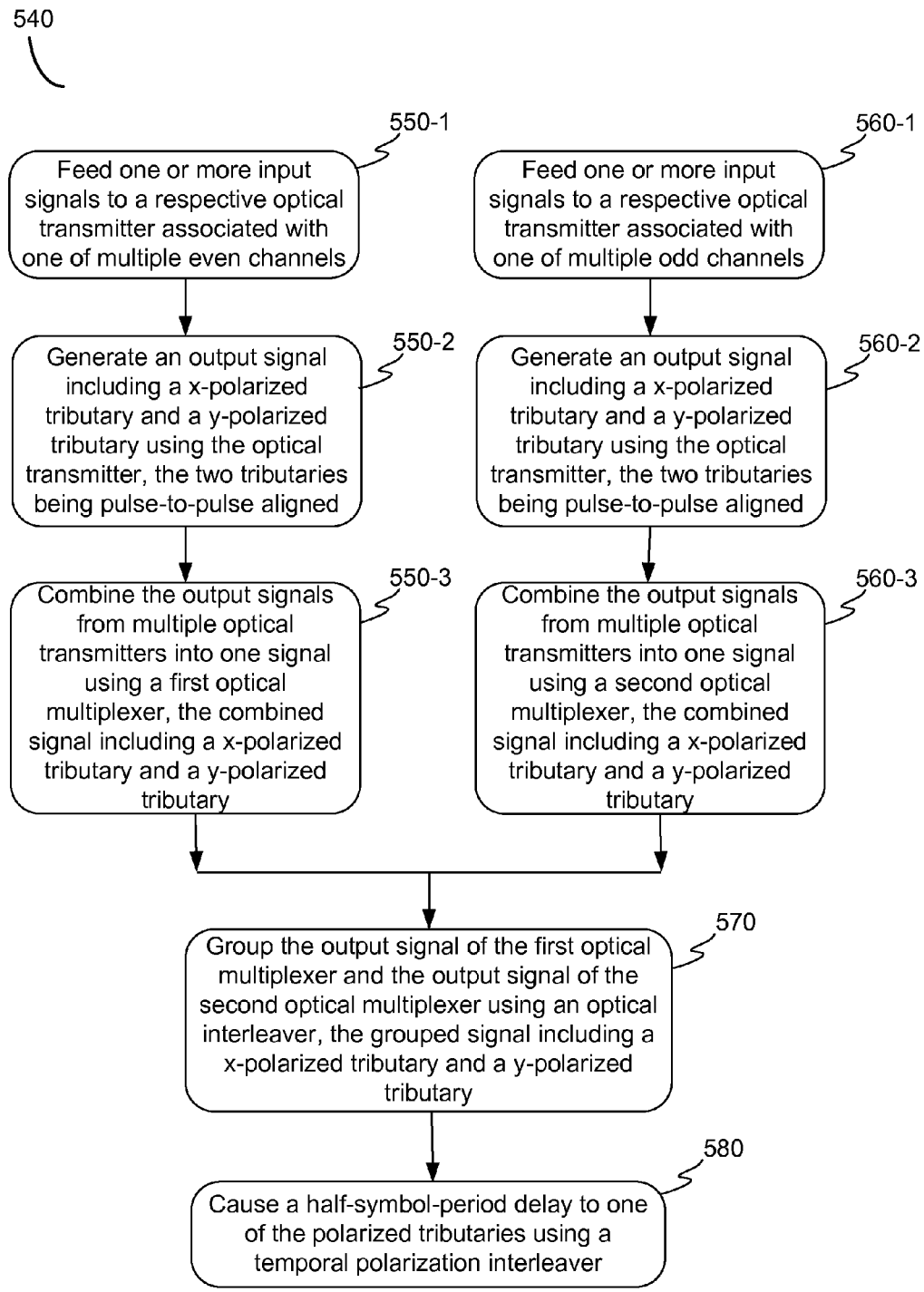
FIG. 5B depicts an exemplary flow chart illustrating how the optical signal transmitting system of FIG. 5A performs temporal polarization interleaving to an optical signal transmitting system in accordance with the present invention.

FIG. 5B depicts an exemplary flow chart illustrating how the optical signal transmitting system of FIG. 5A performs temporal polarization interleaving to an optical signal transmitting system in accordance with the present invention. For each sub-system (500, 510), the includes the steps of: feeding one or more input signals to a respective one of a group of optical transmitters (550-1, 560-1); generating an output signal including a x-polarized tributary and a y-polarized tributary using the respective optical transmitter (550-2, 560-2), the two tributaries being pulse-to-pulse aligned; and combining the output signals from the group of optical transmitters into one output signal of the sub-system using an optical multiplexer (550-3, 560-3), the combined output signal including a x-polarized tributary and a y-polarized tributary. Next, the output signals of the first optical signal transmitting sub-system and the second optical signal transmitting sub-system are grouped into one output signal of the optical signal transmitting system using an optical interleaver (570); and a predefined phase delay is introduced to one of the polarized tributaries in the grouped output signal using a temporal polarization interleaver (580).

Figure 6A:
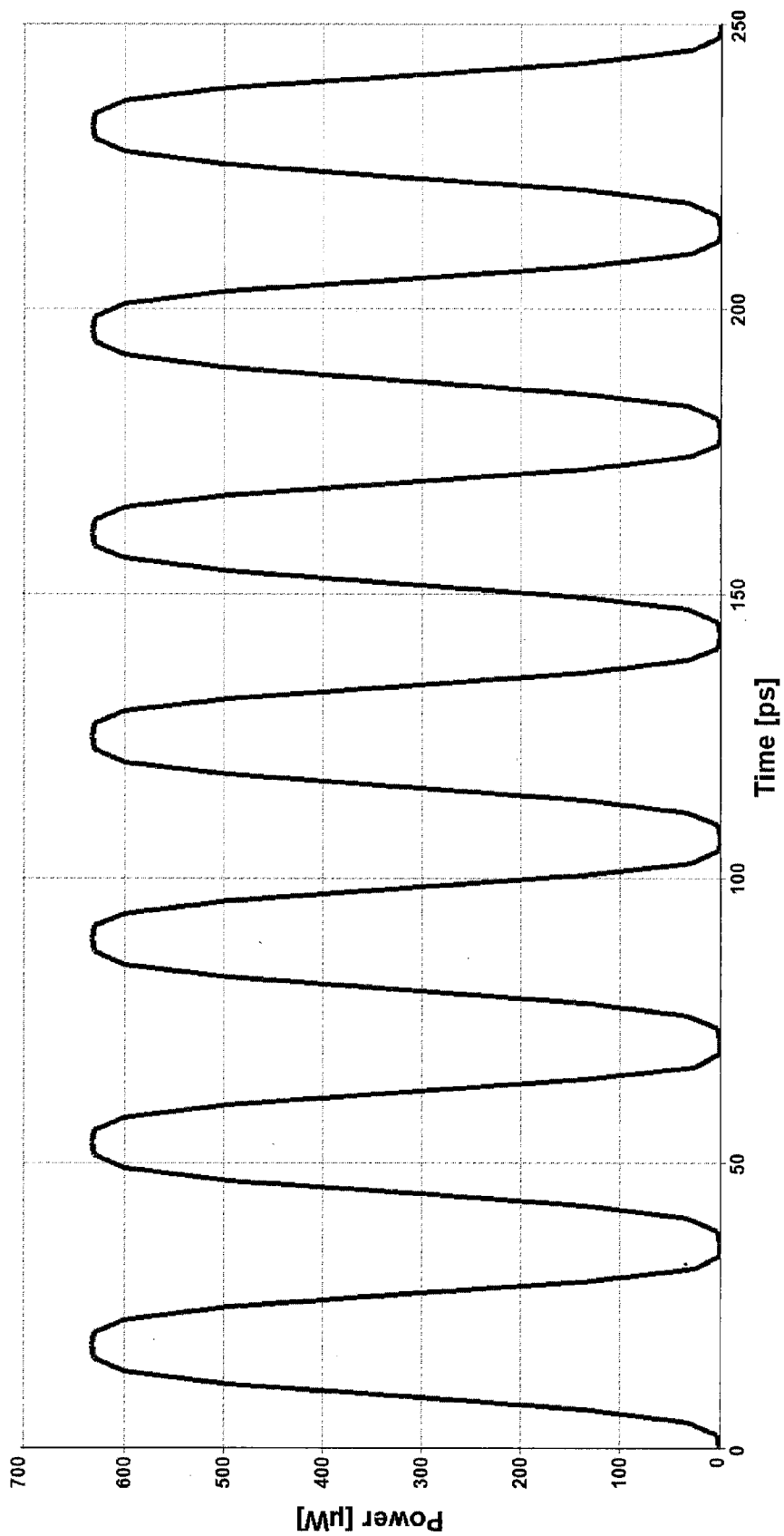
FIGS. 6A and 6B illustrate the respective simulated time waveforms of an even channel before and after the TPI module within an optical signal transmitting system in accordance with the present invention.
Figure 6B:
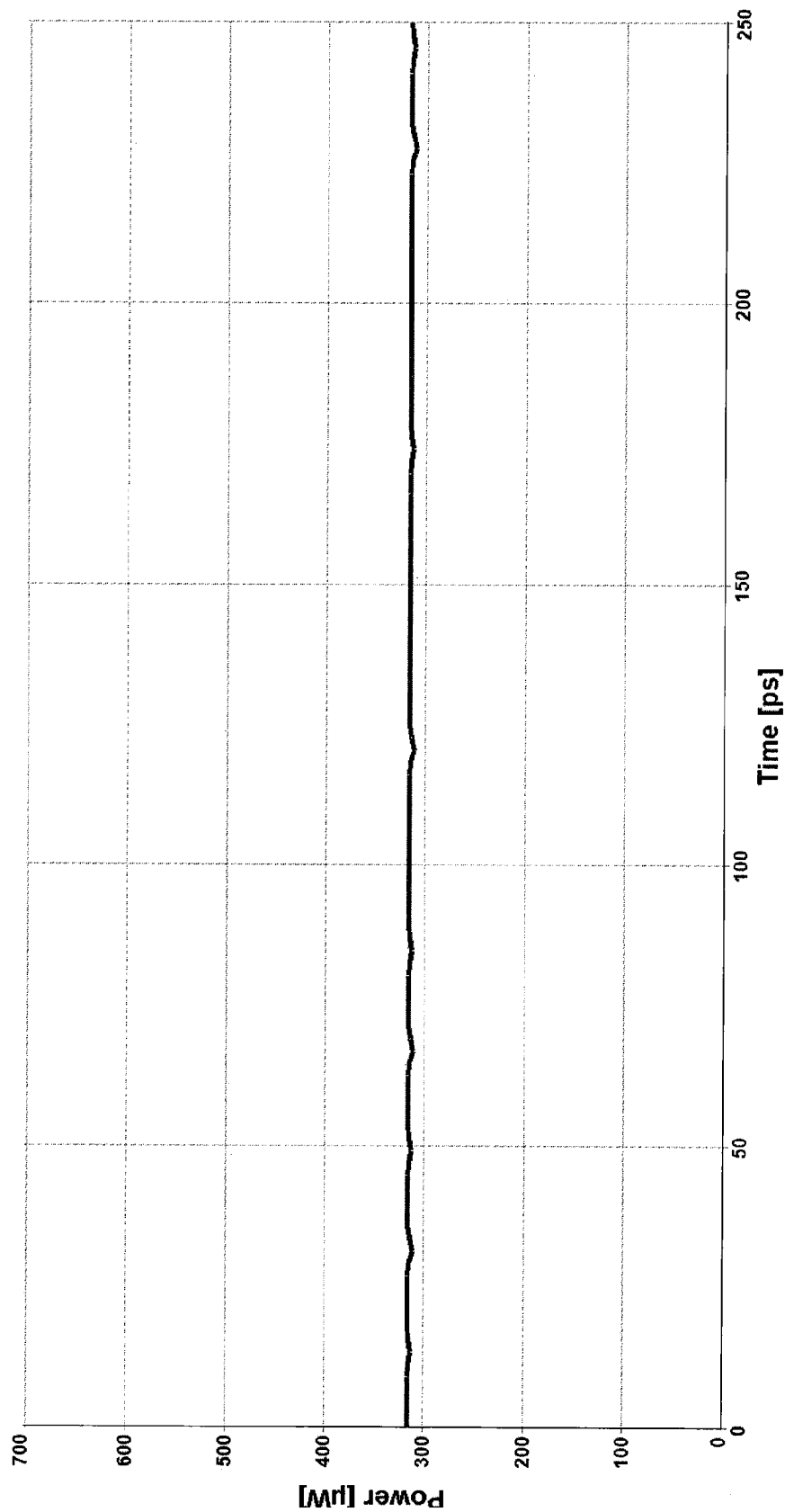

FIGS. 6A and 6B illustrate the respective simulated time waveforms of an even channel before and after the TPI module within an optical signal transmitting system in accordance with the present invention. In this example, a simulation work was carried out with three even and two odd channels operated at C-band, and each of them delivers PolMUX-RZ-QPSK signal at 112 Gb/s with a channel spacing of 50 GHz. The RZ pulse has a duty cycle of 50%. The combined signal was transmitted over 1040 km dispersion-managed single-mode fiber (SMF-28) fiber link, and was individually received and demodulated by a digital coherent receiver. FIG. 6A illustrates the simulated time waveforms of the 2nd even channel captured at a corresponding optical transmitter before the signal reaches the TPI module. FIG. 6B illustrates the simulated time waveforms after passing through the TPI module, which correspond to effectively a stable constant transmitting power over the time.

Figure 7:
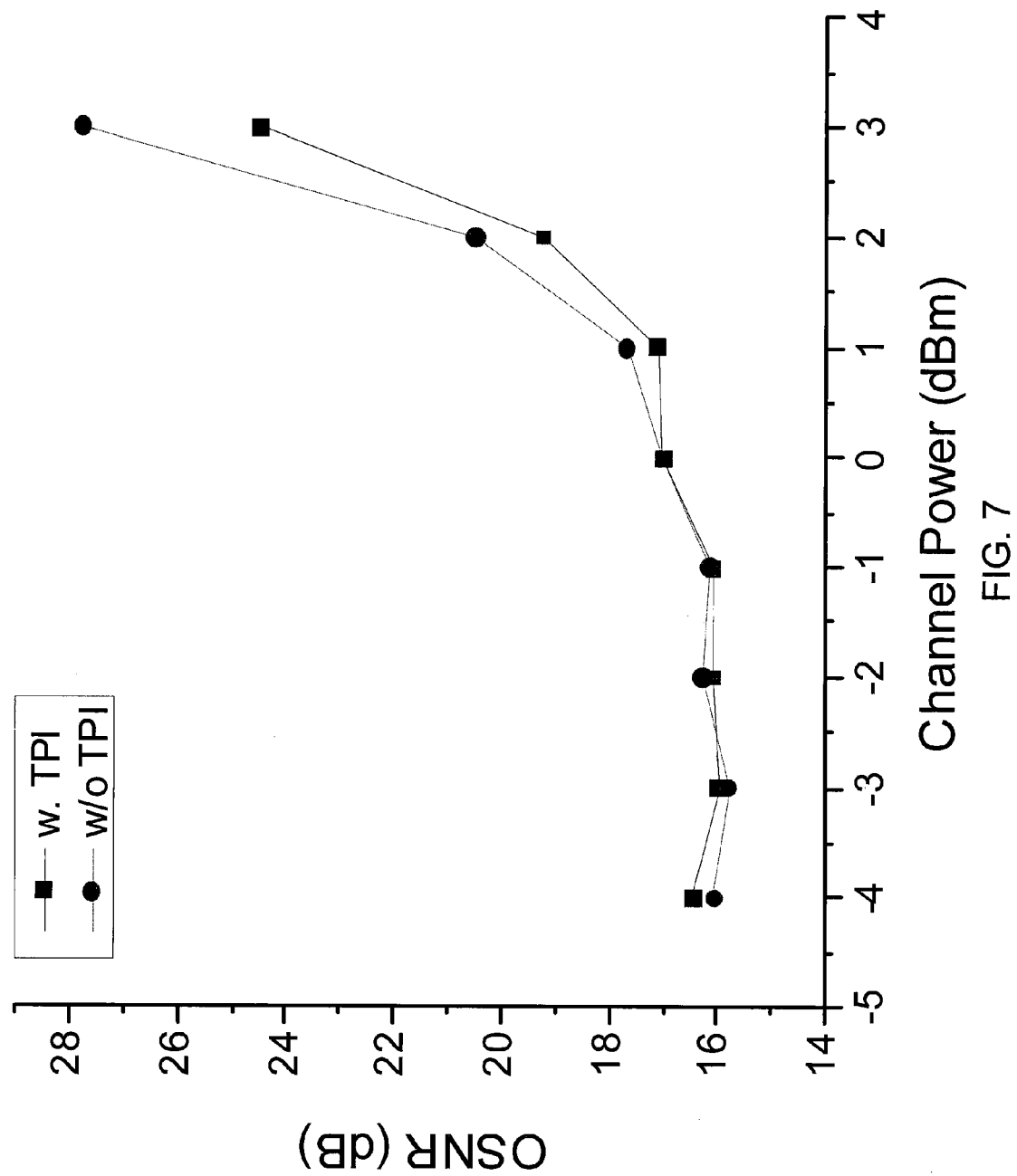
FIG. 7 is a block diagram illustrating the received optical signal to noise ratio (OSNR) at bit error rate of $10^{-3}$ as a function of the launched power per channel with and without temporal polarization interleaving in accordance with the present invention.

FIG. 7 is a block diagram illustrating the required optical signal to noise ratio (OSNR) for achieving a predefined bit error rate of $10^{-3}$ as a function of the launched power per channel with and without temporal polarization interleaving of the established PolMUX optical transmitters in accordance with the present invention. Note that the impact of the TPI module becomes more significant when the channel power is at least 1 dBm or beyond. In this embodiment, the required OSNR for achieving the bit error rate of $10^{-3}$ drops from 0.58 dB to 1.26 dB when the channel power increases from 1 dBm to 2 dBm.

In summary, this invention presents a new and practical optical transmitting system with improved non-linear tolerance by temporal polarization interleaving of established PolMUX optical transmitters. It is designed to support any types of DWDM optical transmission regardless of the channel spacing and the modulation levels.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. An optical signal transmitting system, comprising:
   an optical transmitter including one or more input terminals and an output terminal; and
   a temporal polarization interleaver including an input terminal and an output terminal, wherein the output terminal of the optical transmitter is communicatively coupled to the input terminal of the temporal polarization interleaver,
   wherein:
      the optical transmitter is configured to receive one or more input signals through its one or more input terminals, generate an output signal using the one or more input signals, the output signal including a x-polarized tributary and a y-polarized tributary that is pulse-to-pulse aligned with the x-polarized tributary, and transmit the output signal to the temporal polarization interleaver; and
      the temporal polarization interleaver is configured to receive the output signal from the optical transmitter and cause a predefined phase delay to one of the x-polarized tributary and the y-polarized tributary.

2. The optical signal transmitting system of claim 1, wherein the optical transmitter further includes: an integrable tunable laser assembly, two sets of optical in-phase and quadrature modulators, first and second polarization beam splitters, a Mach-Zehnder return-to-zero pulse carver, and two pairs of electrical amplifiers,
   wherein the integrable tunable laser assembly is configured to transmit a continuous-waveform optical signal into the first polarization beam splitter and the first polarization beam splitter is configured to divide the continuous-waveform optical signal into the x-polarized tributary and the y-polarized tributary,
   wherein each of the x-polarized tributary and the y-polarized tributary is modulated by a respective set of optical in-phase and quadrature modulators in accordance with two respective input signals applied to a respective pair of electrical amplifiers through two respective input terminals of the optical transmitter, and
   wherein the second polarization beam splitter is configured to deliver the modulated x-polarized tributary and the modulated y-polarized tributary to the Mach-Zehnder return-to-zero pulse carver and the Mach-Zehnder return-to-zero pulse carver is configured to cause the modulated x-polarized tributary to be pulse-to-pulse aligned with the modulated y-polarized tributary.

3. The optical signal transmitting system of claim 2, wherein there are two substantially equal optical paths between the first polarization beam splitter and the second polarization beam splitter such that the modulated x-polarized tributary and the modulated y-polarized tributary coming out of the Mach-Zehnder return-to-zero pulse carver are substantially pulse-to-pulse aligned with each other.

4. The optical signal transmitting system of claim 1, wherein the temporal polarization interleaver further includes: an incoming polarization beam splitter for separating the x-polarized tributary of the output signal of the optical transmitter from the y-polarized tributary of the output signal of the optical transmitter, an optical time delay unit for causing the predefined phase delay to the y-polarized tributary, and an outgoing polarization beam splitter for combing the x-polarized tributary and the delayed y-polarized tributary into an output signal of the temporal polarization interleaver.

5. The optical signal transmitting system of claim 1, wherein the predefined phase delay is approximately a half of a symbol period of the output signal.

6. The optical signal transmitting system of claim 1, wherein the temporal polarization interleaver is realized by a single high polarization-mode-dispersion fiber for generating a differential group delay substantially equal to a half of a symbol period between the x-polarized tributary and the y-polarized tributary.

7. The optical signal transmitting system of claim 1, wherein each of the x-polarized tributary and the y-polarized tributary is transmitted along an optical path within the optical signal transmitting system and the optical path includes one or more polarization maintaining fibers.

\* \* \* \* \*